(No Model.)
A. O. GRANGER & J. H. COLLINS, Jr.
Gas Apparatus.
No. 241,134. Patented May 10, 1881.
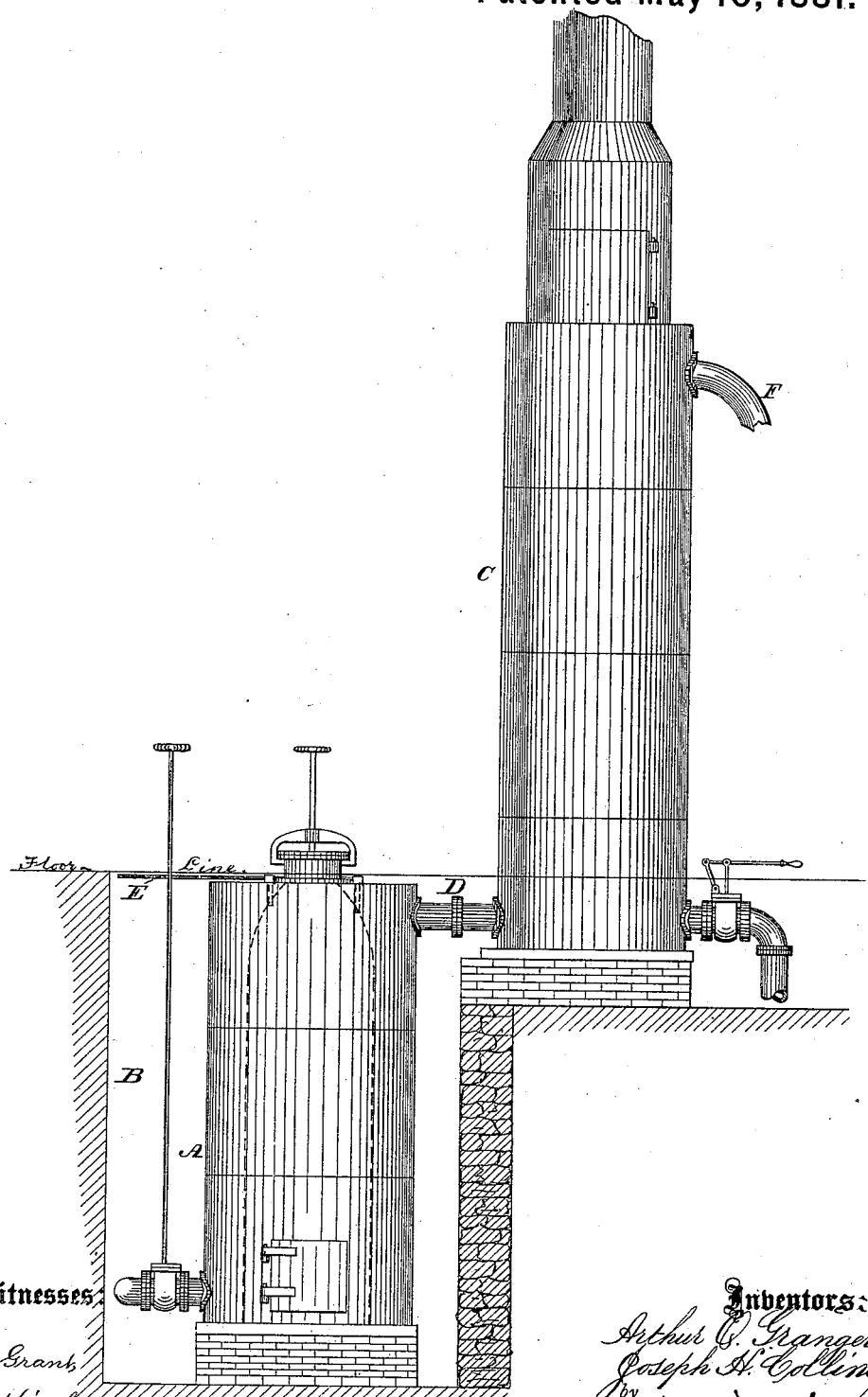

UNITED STATES PATENT OFFICE.

ARTHUR O. GRANGER AND JOSEPH H. COLLINS, JR., OF PHILADELPHIA, PA.

GAS APPARATUS.

SPECIFICATION forming part of Letters Patent No. 241,134, dated May 10, 1881.

Application filed April 22, 1880. (No model.)

*To all whom it may concern:*

Be it known that we, ARTHUR O. GRANGER and JOSEPH H. COLLINS, Jr., both citizens of the United States, and residents of the city and county of Philadelphia, and State of Pennsylvania, have invented a new and useful Improvement in Gas Apparatus, which improvement is fully set forth in the following specification and accompanying drawing, in which the figure is a side elevation.

In the Lowe gas apparatus now in use the generator and superheater are located on the same floor-level, thereby necessitating a gallery for access to the generator for coaling or feeding the latter, and the location of the distributing oil-tank at an elevation above the gallery, requiring pumping of the oil about fifteen feet above the engine and the employment of stairway to reach the tank. Furthermore, as the gas is directed from the top of the generator to the bottom of the superheater, and thus employing a long and exposed pipe with two elbows, the gas is cooled, and becomes difficult of ignition in the combustion-chamber at the bottom of the superheater, all of which objectionable features are remedied by our invention, which consists of the generator located in a pit below the floor-line, so that the top of the same is on the floor-line, and the top of the generator and bottom of the superheater being close to each other, there is a direct connection between them by means of a short and straight pipe, the advantages whereof are that we obviate the employment of the gallery and are enabled to heat the superheater with a less consumption of coal, the distributing oil-tank is proportionately lowered, the coal-hole is conveniently accessible for replenishing purposes, thus also avoiding the hoisting of coal to a gallery, the levers, handles, &c., are easily reached, and the apparatus or works may be erected at reduced expense and with buildings of less height.

In the drawing, A represents the generator, which is located below the floor-line in the pit B.

C represents the superheater, properly supported and having its bottom adjacent to the top of the generator, the communication between the generator and superheater being by means of a short and straight pipe, D, which is connected to the upper end of the generator and lower end of the superheater.

E represents the pipe which directs hydrocarbon fluid or oil into the generator, and F represents the pipe leading to the washer.

It will be seen that the top of the generator is on the floor-line, and the coal-hole thereof is conveniently accessible thereat, thus avoiding hoisting of the coal. The connection of the generator and superheater is direct by means of the short and straight pipe D, which prevents cooling of the gas, the distributing oil-tank is lowered, a gallery is obviated, the building for containing the apparatus may be constructed of less height than heretofore, and the levers, handles, &c., are easily reached.

Having thus described our invention, what we claim as new, and desire to secure by Letters Patent, is—

A gas-apparatus having a generator, A, superheater C, and a short straight connecting-pipe, the generator being located below the floor-line and the pipe directly connecting the generator and superheater, all parts being combined and operating as stated, and for the purpose set forth.

A. O. GRANGER.
JOS. H. COLLINS, JR.

Witnesses:
J. A. WIEDERSHEIM,
W. F. KIRCHER.